(12) United States Patent
Kim et al.

(10) Patent No.: US 8,373,812 B2
(45) Date of Patent: Feb. 12, 2013

(54) LIQUID CRYSTAL DISPLAY DEVICE

(75) Inventors: Hae Yeol Kim, Paju-si (KR); Tae Woong Moon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 641 days.

(21) Appl. No.: 12/610,161

(22) Filed: Oct. 30, 2009

(65) Prior Publication Data

US 2010/0123868 A1    May 20, 2010

(30) Foreign Application Priority Data

Nov. 19, 2008  (KR) .......................... 10-2008-0115189

(51) Int. Cl.
*G02F 1/1343*    (2006.01)
*G02F 1/1368*    (2006.01)
(52) U.S. Cl. .............................. 349/39; 349/42; 349/143
(58) Field of Classification Search .................... 349/38, 349/39, 42, 139, 143; 257/59, 72; 345/92
See application file for complete search history.

(56) References Cited

U.S. PATENT DOCUMENTS

2008/0068516 A1*   3/2008   Mori et al. .................... 348/790
2009/0040408 A1*   2/2009   Ishii ............................... 349/39

* cited by examiner

*Primary Examiner* — Dung Nguyen
*Assistant Examiner* — Tai Duong
(74) *Attorney, Agent, or Firm* — Birch, Stewart, Kolasch & Birch, LLP (57) ABSTRACT

The present invention relates a liquid crystal display device which can minimize resistance of a common line. The liquid crystal display device includes a plurality of data lines and a plurality of common lines arranged alternately, a plurality of gate lines arranged to cross the data lines and the common lines, a pixel electrode formed at every pixel region defined as a region is surrounded by the data line, the common line and the gate line, and at least one auxiliary electrode unit overlapped with a portion of each of the pixel electrodes adjacent to the common line, wherein the auxiliary electrode unit is connected to the common electrode line electrically.

9 Claims, 10 Drawing Sheets

LIQUID CRYSTAL DISPLAY DEVICE

CROSS REFERENCE TO RELATED APPLICATION

This application claims the benefit of the Patent Korean Application No. 10-2008-0115189 filed on Nov. 19, 2008, which is hereby incorporated by reference as if fully set forth herein.

BACKGROUND OF THE DISCLOSURE

1. Field of the Disclosure

The present invention relates to liquid crystal display devices, and more particularly, to a liquid crystal display device which can minimize resistance of a common line.

2. Discussion of the Related Art

The liquid crystal display device controls light transmissivities of liquid crystal cells for displaying an image. Having a switching device formed at every pixel cell, the liquid crystal display device of an active matrix type is favorable for displaying a motion picture. As the switching device, a thin film transistor (TFT) is used, mostly.

The liquid crystal display device is provided with a plurality of gate lines and a plurality of data lines crossing to each other, and a pixel cell formed at every pixel region defined by the plurality of gate lines and data lines.

Each pixel cell is provided with a storage capacitor for maintaining a data signal applied thereto for one frame period securely. The storage capacitor uses a portion of the common line which transmits a common voltage as an upper or a lower electrode. Accordingly, reducing resistance of the common line is important.

SUMMARY OF THE DISCLOSURE

Accordingly, the present invention is directed to a liquid crystal display device.

An object of the present invention is to provide a liquid crystal display device which can minimize resistance of a common line.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a plurality of data lines and a plurality of common lines arranged alternately, a plurality of gate lines arranged to cross the data lines and the common lines, a pixel electrode formed at every pixel region defined as a region is surrounded by the data line, the common line and the gate line, and at least one auxiliary electrode unit overlapped with a portion of each of the pixel electrodes adjacent to the common line, wherein the auxiliary electrode unit is connected to the common electrode line electrically.

The auxiliary electrode unit includes a first auxiliary line positioned on one side of the common line overlapped with a portion of the pixel electrode positioned on one side of the common line, and a second auxiliary line positioned on the other side of the common line overlapped with a portion of the pixel electrode positioned on the other side of the common line, wherein the first auxiliary line has one side end connected to the second auxiliary line at one side end thereof.

The liquid crystal display device further includes a first joining unit connected between one side ends of the first and second auxiliary lines and the common line at one side thereof.

The first auxiliary line has the other end connected to the other end of the second auxiliary line.

The liquid crystal display device further includes a second joining unit connected between the other side ends of the first and second auxiliary lines and the common line at the other side thereof.

The common line is formed of a material identical to the data line, the first and second auxiliary lines are formed of a material identical to the gate line, and the first joining unit and the second joining unit are formed of a material identical to the pixel electrode.

The liquid crystal display device further includes an auxiliary common line overlapped with a portion of a pixel electrode positioned close to the data line, and an auxiliary joining unit in the middle of the pixel electrode for connecting the auxiliary common line to the auxiliary electrode unit electrically, wherein the auxiliary common line, the auxiliary electrode unit, and the auxiliary joining unit are formed as one unit.

The auxiliary common line, the auxiliary electrode unit, and the auxiliary joining unit are formed of a material identical to the gate line.

The gate lines include a first gate line positioned over a row of pixels including a horizontal line of pixels arranged on a horizontal line, and a second gate line positioned under the row of pixels.

Of the pixel cells arranged on a horizontal line, odd numbered pixel cells are connected to the first gate lines and even numbered pixel cells are connected to the second gate line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
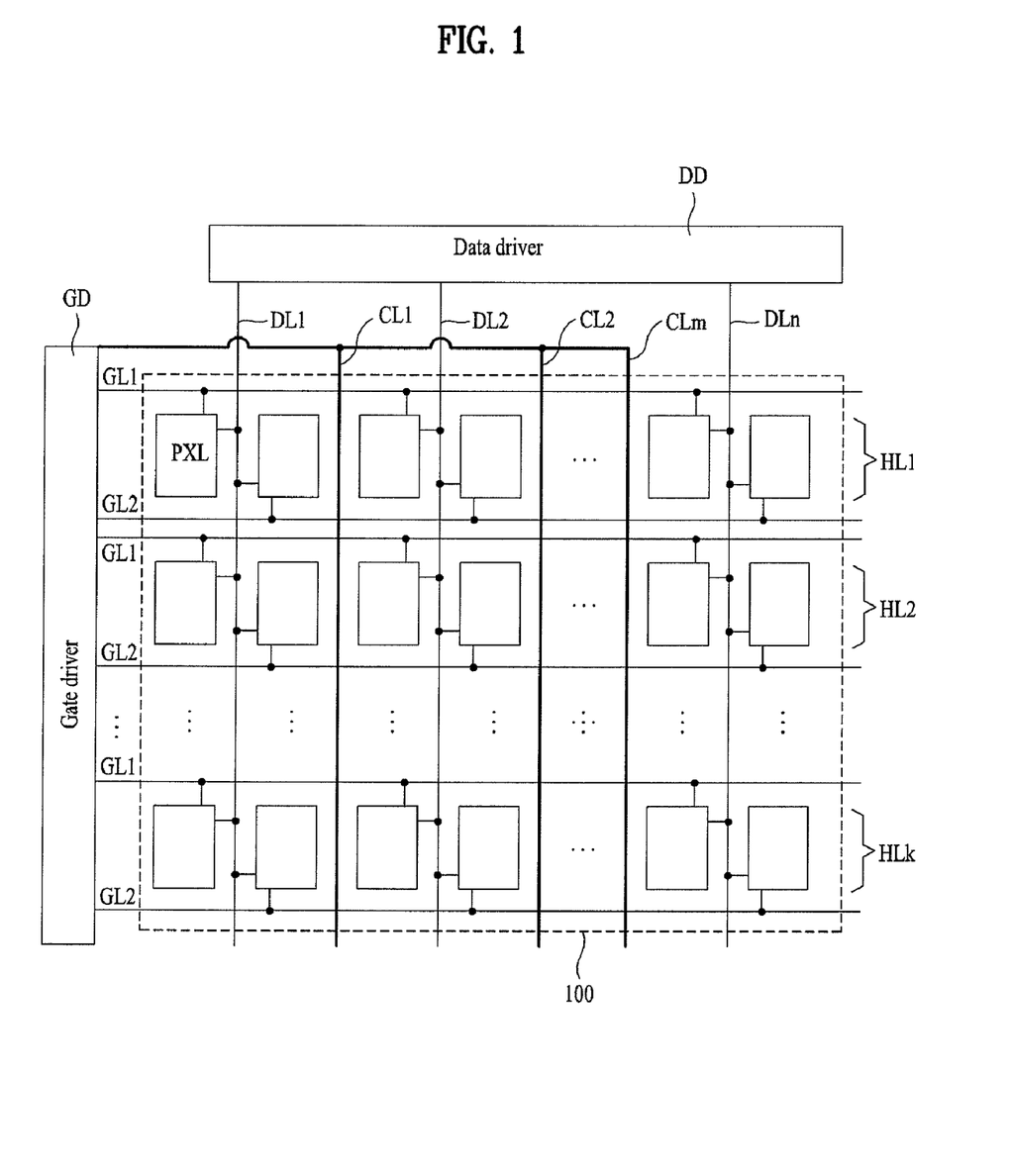
FIG. 1 illustrates a diagram of a liquid crystal display device in accordance with a preferred embodiment of the present invention.

FIG. 1 illustrates a diagram of a liquid crystal display device in accordance with a preferred embodiment of the present invention.

Referring to FIG. 1, the liquid crystal display device includes a liquid crystal panel 100 having a plurality of pixel cells, a gate driver GD for driving gate lines, and common lines of the liquid crystal panel 100, and a data driver DD for driving data lines of the liquid crystal panel 100.

The data lines DL1~DLn and the common lines CL1~CLm are arranged parallel to each other, alternately. The gate lines are arranged to cross the data lines DL1~DLn and the common lines CL1~CLm.

The gate lines include a plurality of first and second gate lines GL1, GL2 arranged alternately. The first gate lines GL1 are positioned over horizontal lines HL1~HLk respectively, and the second gate lines GL2 are positioned under the horizontal lines HL1~HLk respectively.

A region surrounded by the first gate line GL1, the second gate line GL2, the data line, and the common line are a pixel region having the pixel cell PXL formed thereon.

The pixel cell PXL includes a red pixel cell for displaying a red image, a green pixel cell for displaying a green image, and a blue pixel cell for displaying a blue image. Of the plurality of pixel cells PXL arranged along a horizontal line, odd numbered pixel cells are connected to the first gate line GL1, and even numbered pixel cells are connected to the second gate line GL2.

Two pixel cells PXL on opposite sides of one data line are connected to the one data line in common.

Under a common line, there is at least one auxiliary electrode unit overlapped with a portion each of the pixel electrodes adjacent to the common line in a state the auxiliary electrode unit is connected to the common line. The auxiliary electrode unit will be described in detail.

Figure 2:
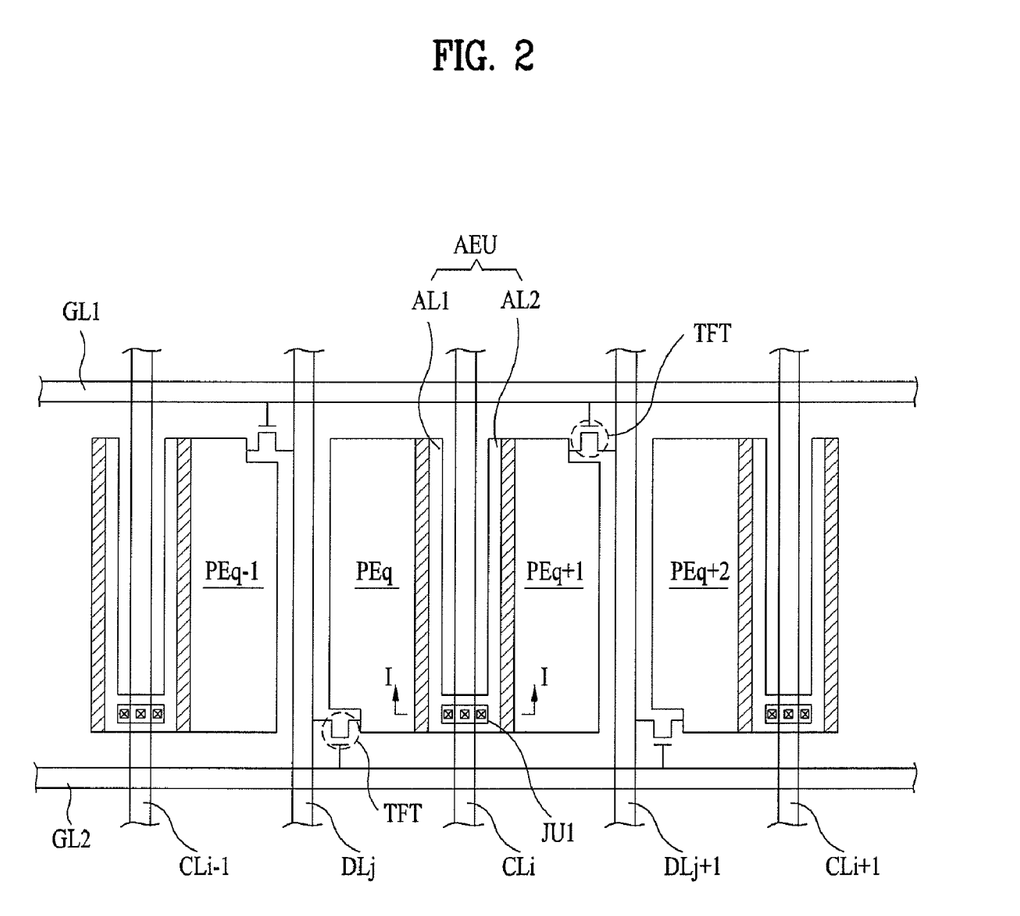
FIG. 2 illustrates a diagram for describing a structure of an auxiliary electrode unit in accordance with a first preferred embodiment of the present invention.
Figure 3:
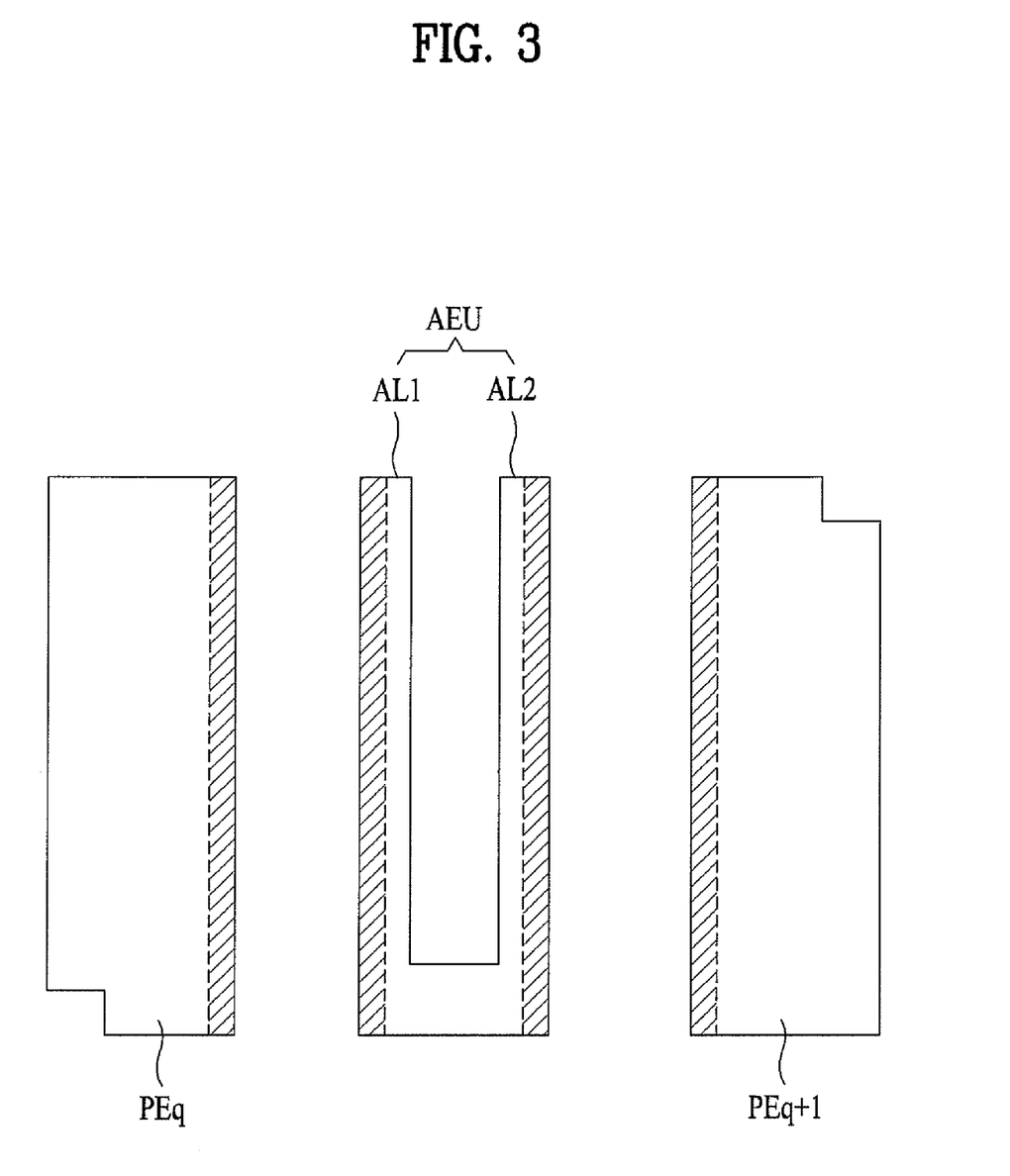
FIG. 3 illustrates a diagram showing a shape of the auxiliary electrode unit in FIG. 2.
Figure 4:
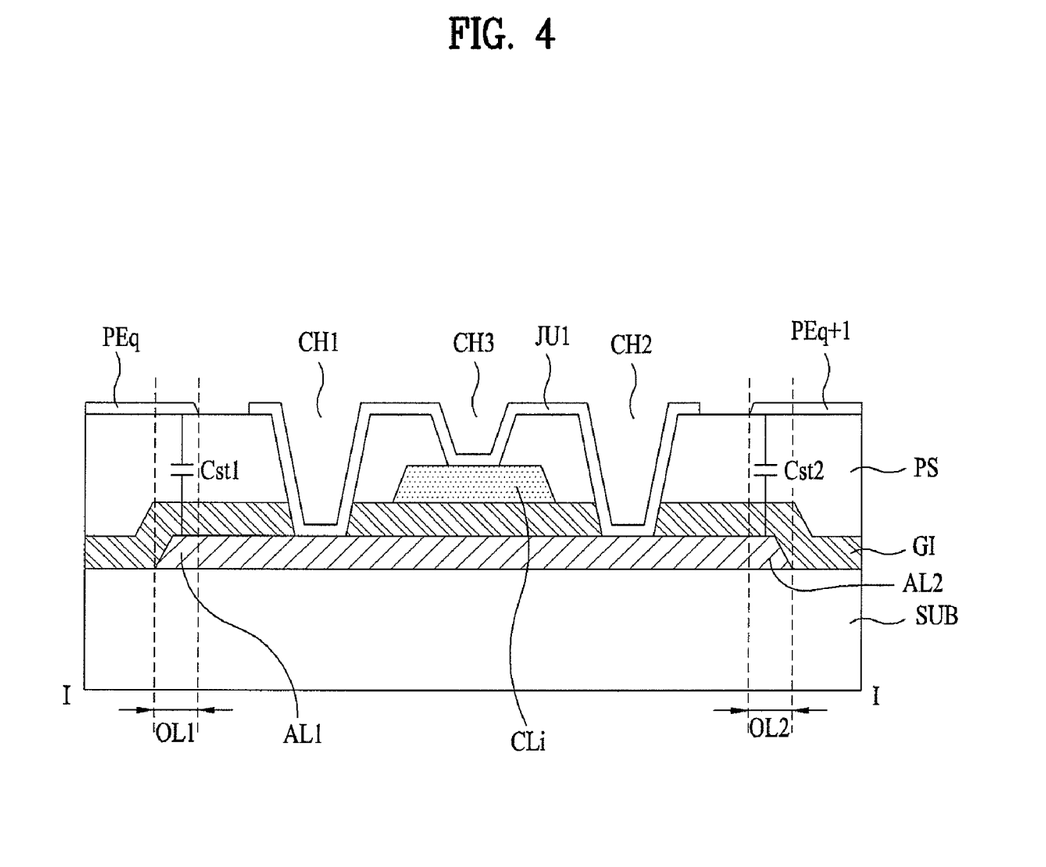
FIG. 4 illustrates a section across a line I-I in FIG. 2.

FIG. 2 illustrates a diagram for describing a structure of an auxiliary electrode unit (AEU) in accordance with a first preferred embodiment of the present invention, FIG. 3 illustrates a diagram showing a shape of the auxiliary electrode unit in FIG. 2, and FIG. 4 illustrates a section across a line I-I in FIG. 2.

Referring to FIG. 2, the pixel cell PXL includes the thin film transistor TFT and the pixel electrode. The thin film transistor TFT is turned on in response to a gate signal from the first or second gate line GL1 or GL2, and, when turned on, supplies a data signal to the pixel electrode PEq from the data line DLi. A liquid crystal layer (not shown) is formed between the pixel electrode PEq and the common electrode (now shown) positioned opposite to the pixel electrode PEq, so that transmissivity of the liquid crystal layer varies with supply of the data signal to the pixel electrode PEq for displaying an image.

Referring to FIGS. 2~4, the auxiliary electrode unit AEU in accordance with a first preferred embodiment of the present invention includes a first auxiliary line AL1 and a second auxiliary line AL2.

The first auxiliary line AL1 is positioned on one side of the common line CLi overlapped with a portion of the pixel electrode PEq positioned on one side of the common line CLi. The second auxiliary line AL2 is positioned on the other side of the common line CLi overlapped with a portion of the pixel electrode PEq+1 positioned on the other side of the common line CLi. The first auxiliary line AL1 has one side end connected to the second auxiliary line AL2 at one side end thereof. In the meantime, there is a first joining unit JU1 which connects the one side ends of the first and second auxiliary lines Al1 and AL2 and one side of the common line CLi to one another, electrically. As the first joining unit JU1 connects the first and second auxiliary lines Al1 and AL2 to the common line CLi, a common voltage is supplied to the first and second auxiliary lines Al1 and AL2 from the common line CLi.

For an example, referring to FIGS. 2~4, the first auxiliary line AL1 on one side of each of the common line CLi has an edge overlapped with the pixel electrode PEq at an edge thereof. Formed at a portion OL1 having the first auxiliary line AL1 and the pixel electrode PEq overlapped therewith, there is a first storage capacitor Cst1. The first auxiliary line AL1 at the first storage capacitor Cst1 serves as a lower electrode of the capacitor, the pixel electrode PEq at the first storage capacitor Cst1 serves as an upper electrode of the capacitor, and a gate insulating film GI and a protective film PS between the upper electrode and the lower electrode serve as dielectrics of the capacitor.

Similar to this, a second auxiliary line AL2 on the other side of each of the common lines CLi has an edge overlapped with an edge of the pixel electrode PEq+1. Formed at a portion OL2 having the second auxiliary line AL2 and the pixel electrode PEq+1 overlapped therewith, there is a second storage capacitor Cst2. The second auxiliary line AL2 at the second storage capacitor Cst2 serves as a lower electrode of the capacitor, the pixel electrode PEq+1 at the second storage capacitor Cst2 serves as an upper electrode of the capacitor, and the gate insulating film GI and the protective film PS between the upper electrode and the lower electrode serve as dielectrics of the capacitor.

Hatched portions in FIGS. 2 and 3 are the portions OL1 and OL2 having the auxiliary electrode unit AEU and the pixel electrodes PEq overlapped therewith respectively, to form the first and second storage capacitors Cst1 and Cst2 respectively.

Referring to FIG. 4, there is a first contact hole CH1 having a portion of the first auxiliary line AL1 exposed therethrough, and there is a second contact hole CH2 having a portion of the second auxiliary line AL2 exposed therethrough. The first and second contact holes CH1 and CH2 are formed by removing portions of the protective film PS and the gate insulating film GI, respectively. There is a third contact hole CH3 having a portion of one side of the common line CLi exposed therethrough. The first joining unit JU1 connects the first, second auxiliary lines AL1 and AL2 and the common line CLi with the first to third contact holes CH1, CH2, and CH3. An unexplained reference symbol SUB denotes a lower substrate of the liquid crystal display panel 100.

In the meantime, if the lower substrate is fabricated by a four mask process, there are a semiconductor layer and an ohmic layer formed between the auxiliary electrode unit AEU and the gate insulating film GI formed, additionally.

The common line CLi is formed of a material identical to the data line DLj, the first and second auxiliary lines AL1 and AL2 are formed of a material identical to the gate line, and the first joining unit JU1 is formed of a material identical to the pixel electrode PEq.

Figure 5:
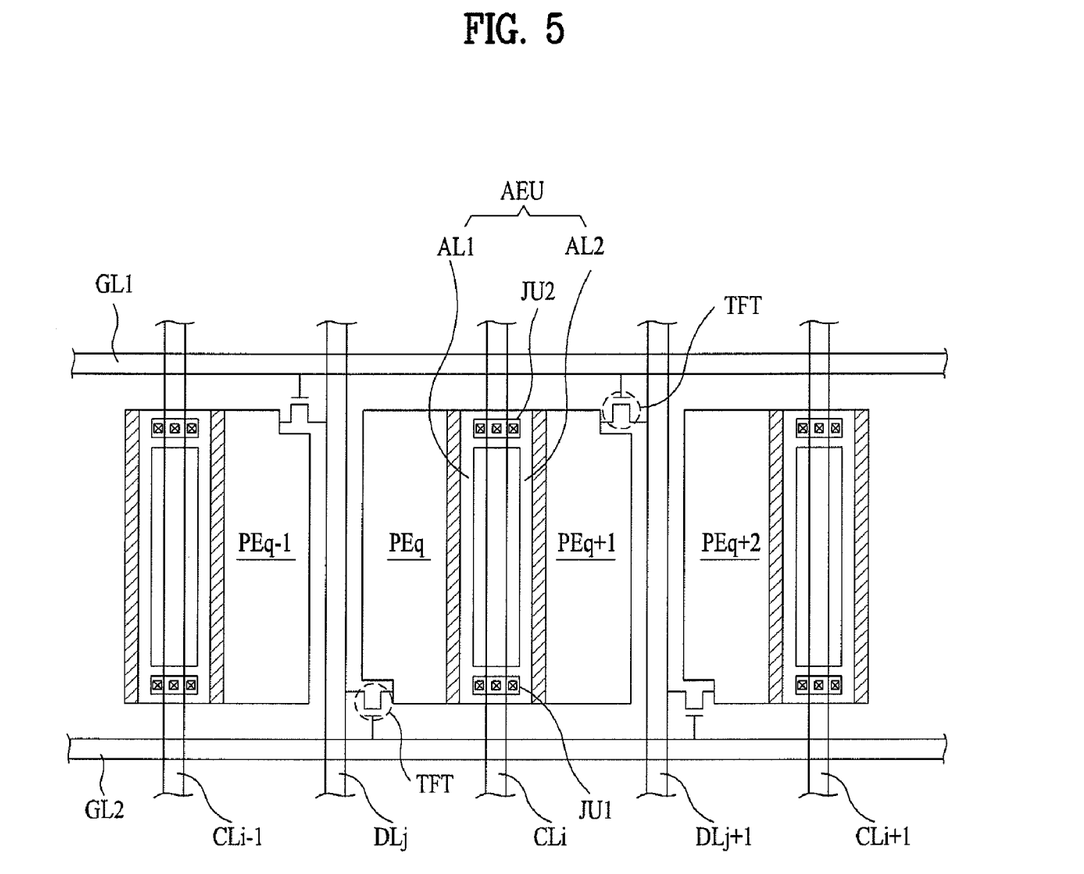
FIG. 5 illustrates a diagram for describing a structure of an auxiliary electrode unit in accordance with a second preferred embodiment of the present invention.
Figure 6:
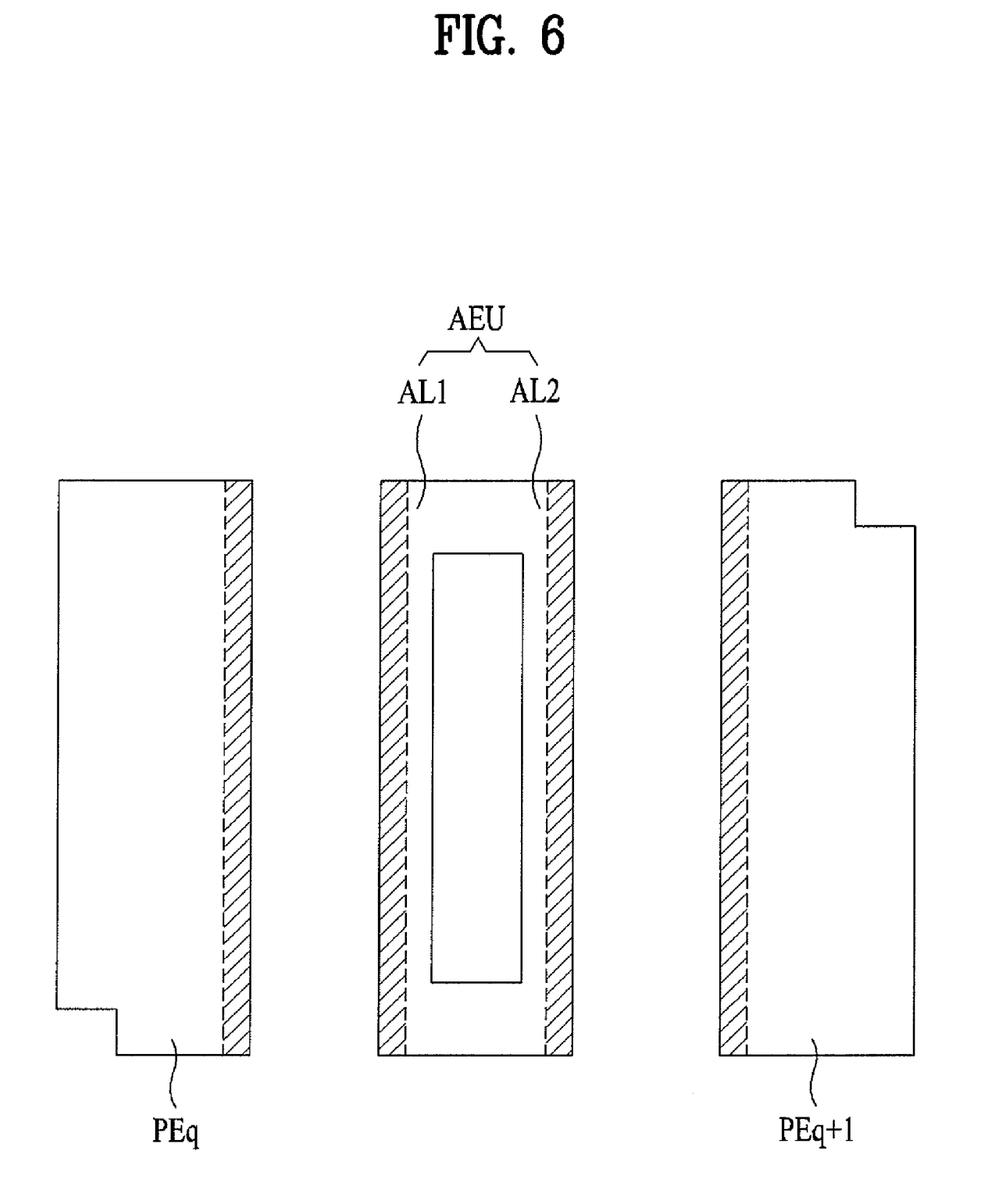
FIG. 6 illustrates a diagram showing a shape of the auxiliary electrode unit in FIG. 5.

FIG. 5 illustrates a diagram for describing a structure of an auxiliary electrode unit in accordance with a second preferred embodiment of the present invention, and FIG. 6 illustrates a diagram showing a shape of the auxiliary electrode unit in FIG. 5.

Referring to FIGS. 5 and 6, the an auxiliary electrode unit AEU in accordance with a second preferred embodiment of the present invention is almost identical to the auxiliary electrode unit AEU in accordance with the first preferred embodiment of the present invention, except that the other ends of the first auxiliary line AL1 and the second auxiliary line AL2 are connected to each other. There is a second joining unit JU2 which connects the other ends of the first and second auxiliary lines AL1 and AL2 and the other side of the common line CLi to one another, electrically. The connection between the other ends of the first and second auxiliary lines AL1 and AL2 and the second joining unit JU2 has a structure identical to one shown in FIG. 4.

The common line CLi is formed of a material identical to the data line DLj, the first and second auxiliary lines AL1 and AL2 are formed of a material identical to the gate line, and the first and second joining units JU1 and JU2 are formed of a material identical to the pixel electrode PEq.

Hatched portions in FIGS. 5 and 6 are the portions having the auxiliary electrode unit AEU and the pixel electrodes PEq overlapped therewith respectively, to form the first and second storage capacitors, respectively.

Figure 7:
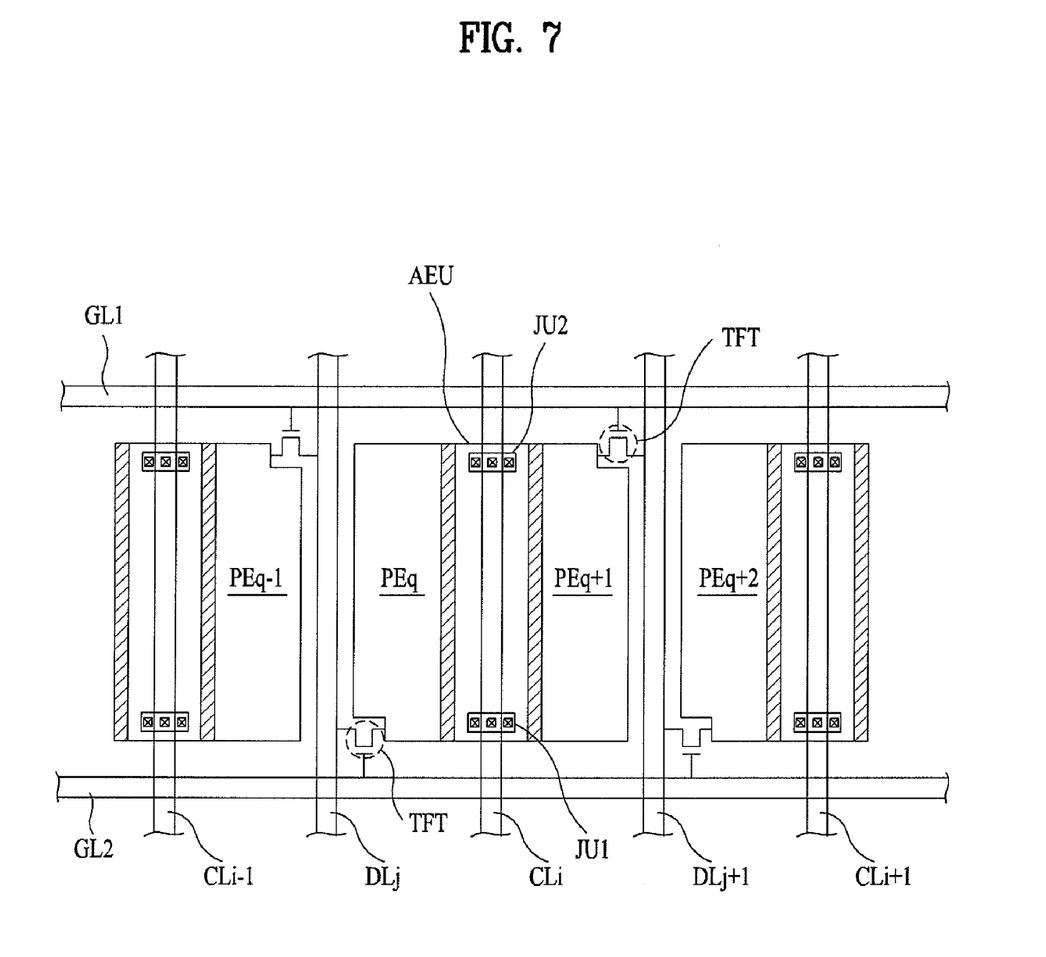
FIG. 7 illustrates a diagram for describing a structure of an auxiliary electrode unit in accordance with a third preferred embodiment of the present invention.
Figure 8:
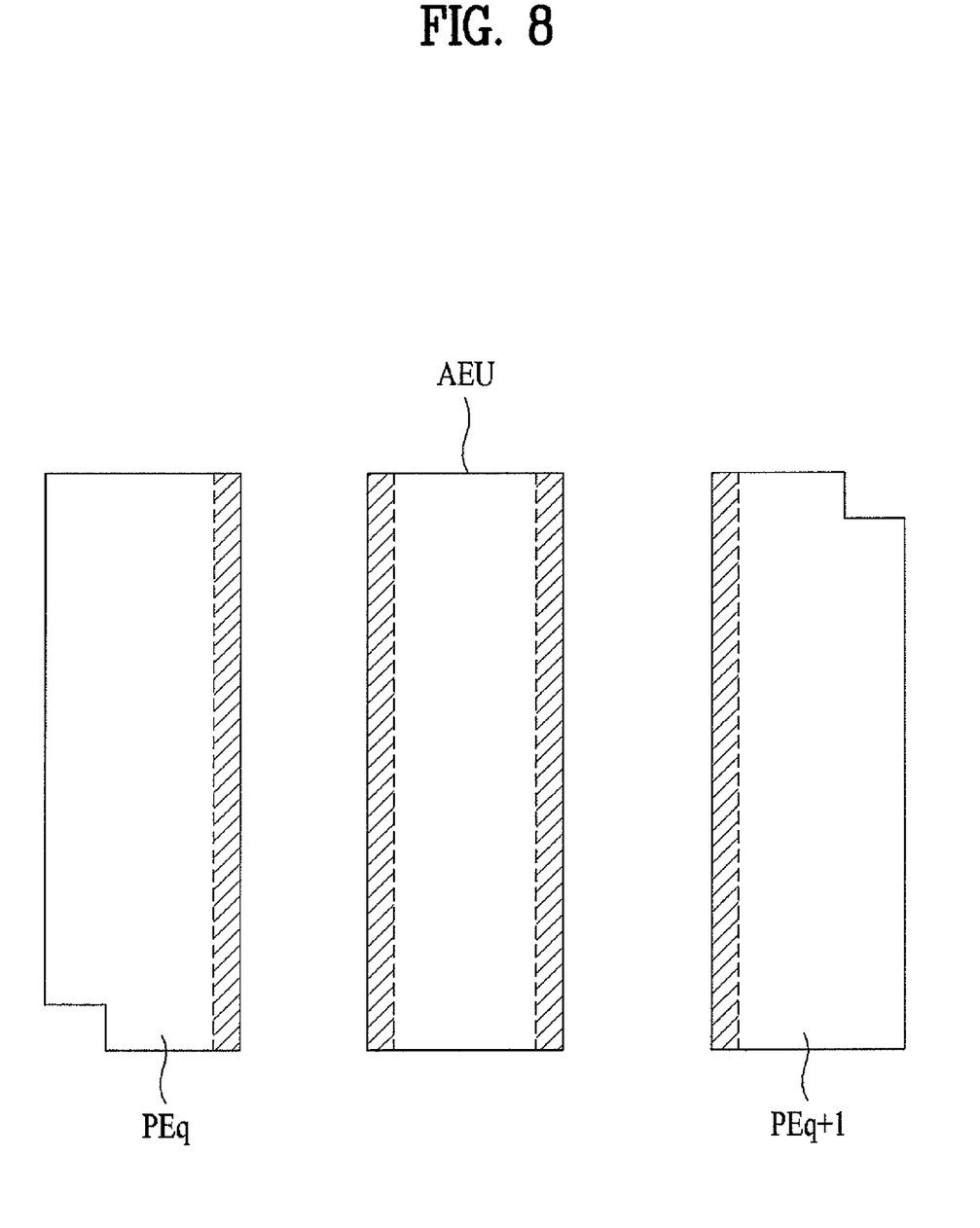
FIG. 8 illustrates a diagram showing a shape of the auxiliary electrode unit in FIG. 7.

FIG. 7 illustrates a diagram for describing a structure of an auxiliary electrode unit AEU in accordance with a third preferred embodiment of the present invention, and FIG. 8 illustrates a diagram showing a shape of the auxiliary electrode unit AEU in FIG. 7.

Referring to FIGS. 7 and 8, the auxiliary electrode unit AEU is rectangular. The auxiliary electrode unit AEU has one end connected to one side of the common line CLi with a first joining unit JU1 electrically, and the other end connected to the other side of the common line CLi with a second joining unit JU1 electrically.

The common line CLi is formed of a material identical to the data line DLj, the auxiliary electrode unit AEU is formed of a material identical to the gate line, and the first and second joining units JU1 and JU2 are formed of a material identical to the pixel electrode PEq.

Hatched portions in FIGS. 7 and 8 are portions having the auxiliary electrode unit AEU and the pixel electrodes PEq overlapped therewith respectively, to form storage capacitors respectively.

Figure 9:
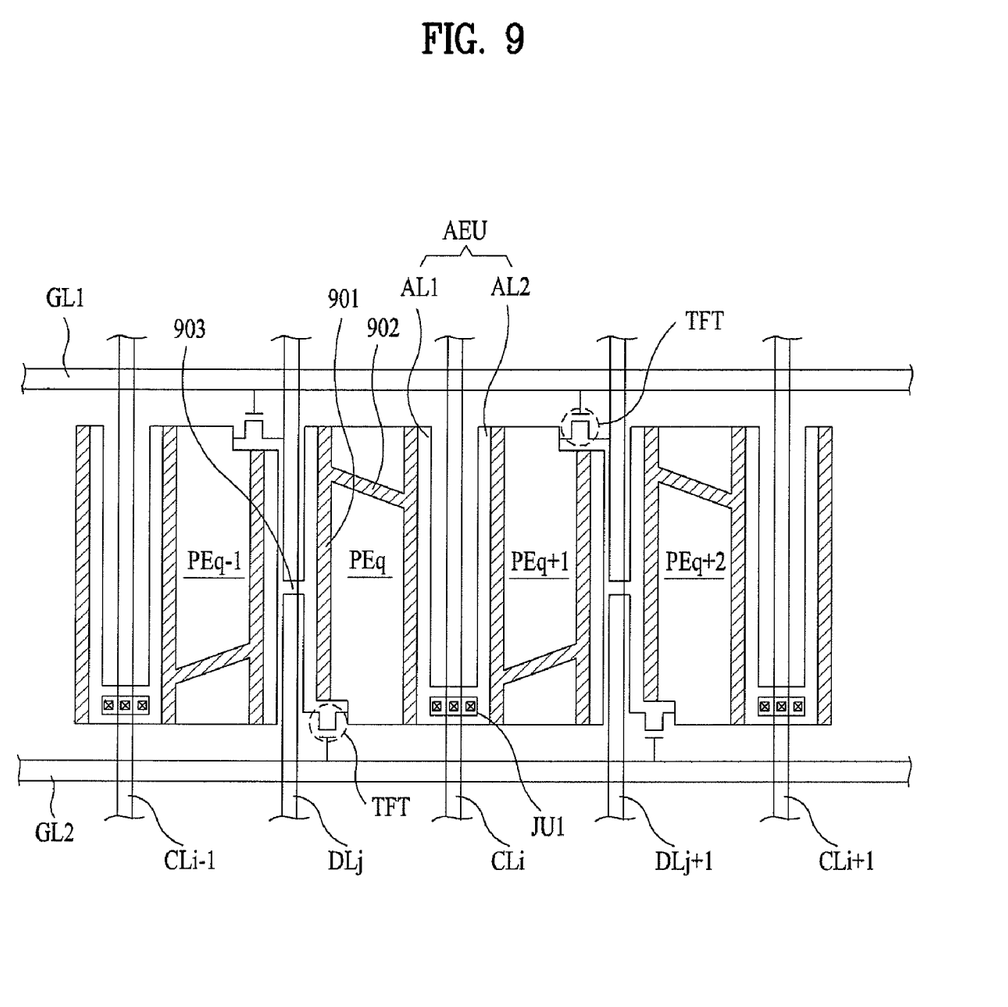
FIG. 9 illustrates a diagram for describing a structure of an auxiliary electrode unit in accordance with a fourth preferred embodiment of the present invention.
Figure 10:
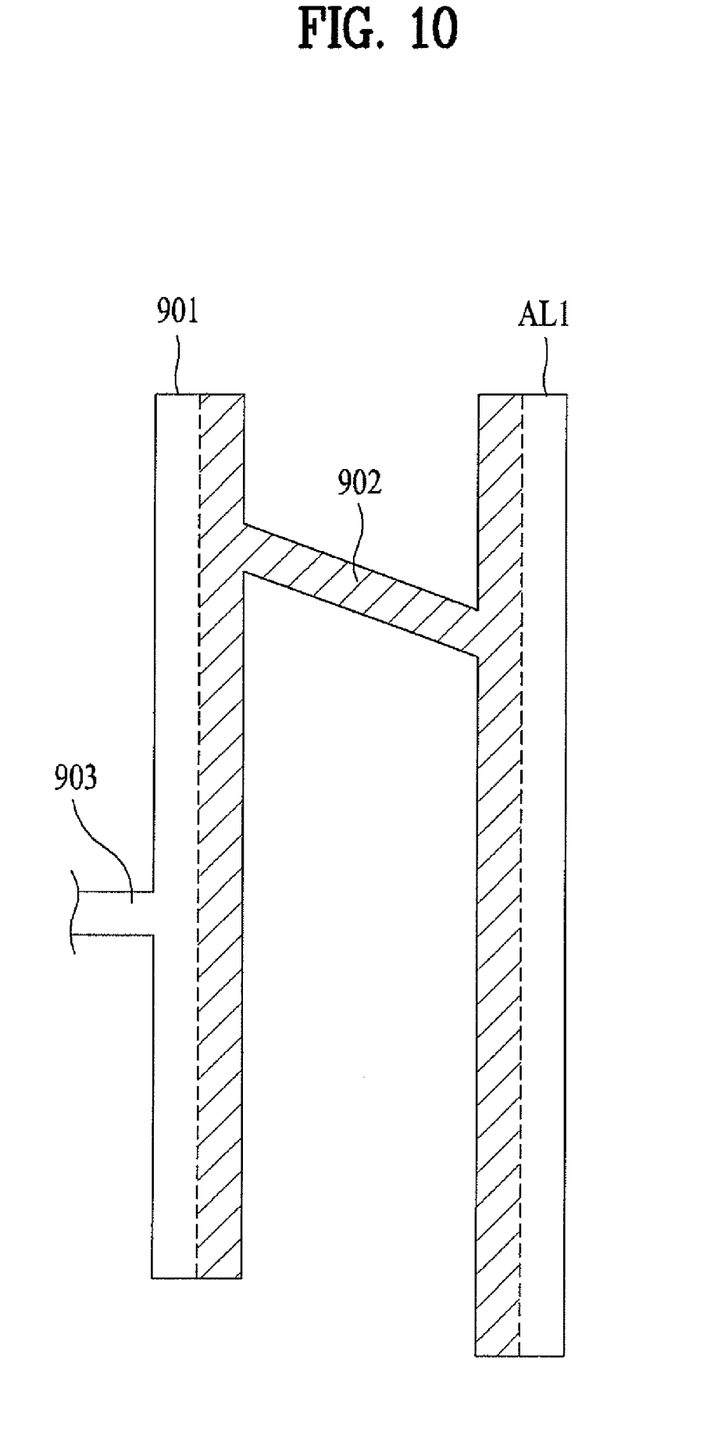
FIG. 10 illustrates a diagram showing a shape of the auxiliary electrode unit in FIG. 9.

FIG. 9 illustrates a diagram for describing a structure of an auxiliary electrode unit AEU in accordance with a fourth preferred embodiment of the present invention, and FIG. 10 illustrates a diagram showing a shape of the auxiliary electrode unit AEU in FIG. 9.

Referring to FIGS. 9 and 10, the liquid crystal display device includes an auxiliary common line 901 overlapped with a portion of a pixel electrode PEq positioned close to the data line DLi, and an auxiliary joining unit 902 in the middle of the pixel electrode PEq for connecting the auxiliary common line 901 to the auxiliary electrode unit AEU electrically, additionally.

The auxiliary common line 901, the auxiliary electrode unit AEU, and the auxiliary joining unit 902 are formed as one unit. In the meantime, the auxiliary common line 901, the auxiliary electrode unit AEU, and the auxiliary joining unit 902 are formed of a material identical to the gate line.

Hatched portions in FIGS. 9 and 10 are portions having the auxiliary electrode unit AEU (or the auxiliary common line 901 or the common joining unit 902) and the pixel electrodes PEq overlapped therewith respectively, to form storage capacitors, respectively.

An unexplained reference numeral 903 denotes a joining unit connected between auxiliary common lines of adjacent pixels. The joining unit 903 is also formed of a material identical to the gate line.

Thus, by forming a common line CLi between pixel cells PXL having no data line positioned thereto for forming a storage capacitor, the present invention can prevent aperture from reducing, and by forming an auxiliary electrode unit AEU of a material identical to a gate line and connecting the auxiliary electrode unit AEU to a common line CLi, to reduce resistance of the common line CLi, the present invention can prevent distortion of the common voltage at the common line CLi.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
a plurality of data lines and a plurality of common lines arranged alternately;
a plurality of gate lines arranged to cross the data lines and the common lines;
a pixel electrode formed at every pixel region defined as a region is surrounded by the data line, the common line and the gate line; and
at least one auxiliary electrode unit overlapped with a portion of each of the pixel electrodes adjacent to the common line, wherein the auxiliary electrode unit is connected to the common line electrically;
wherein the auxiliary electrode unit includes:
a first auxiliary line positioned on one side of the common line overlapped with a portion of the pixel electrode positioned on one side of the common line, and
a second auxiliary line positioned on the other side of the common line overlapped with a portion of the pixel electrode positioned on the other side of the common line,
wherein the first auxiliary line has one side end connected to the second auxiliary line at one side end thereof.

2. The liquid crystal display device as claimed in claim 1, further comprising a first joining unit connected between one side ends of the first and second auxiliary lines and the common line at one side thereof.

3. The liquid crystal display device as claimed in claim 1, wherein the first auxiliary line has the other end connected to the other end of the second auxiliary line.

4. The liquid crystal display device as claimed in claim 3, further comprising a second joining unit connected between the other side ends of the first and second auxiliary lines and the common line at the other side thereof.

5. The liquid crystal display device as claimed in claim 4, wherein the common line is formed of a material identical to the data line,
the first and second auxiliary lines are formed of a material identical to the gate line, and the first joining unit and the second joining unit are formed of a material identical to the pixel electrode.

6. The liquid crystal display device as claimed in claim 1, further comprising:

an auxiliary common line overlapped with a portion of a pixel electrode positioned close to the data line; and an auxiliary joining unit connecting the auxiliary common line to the auxiliary electrode unit electrically, wherein the auxiliary common line, the auxiliary electrode unit, and the auxiliary joining unit are formed as one unit.

7. The liquid crystal display device as claimed in claim 6, wherein the auxiliary common line, the auxiliary electrode unit, and the auxiliary joining unit are formed of a material identical to the gate line.

8. The liquid crystal display device as claimed in claim 1, wherein the gate lines include;

a first gate line positioned over a row of pixels including a horizontal line of pixels arranged on a horizontal line; and a second gate line positioned under the row of pixels.

9. The liquid crystal display device as claimed in claim 8, wherein, of the pixel cells arranged on a horizontal line, odd numbered pixel cells are connected to the first gate line and even numbered pixel cells are connected to the second gate line.

\* \* \* \* \*